Feb. 2, 1971 G. W. IRWIN ET AL 3,559,425
GLASSWARE TAKEOUT APPARATUS
Filed May 20, 1968 9 Sheets-Sheet 4
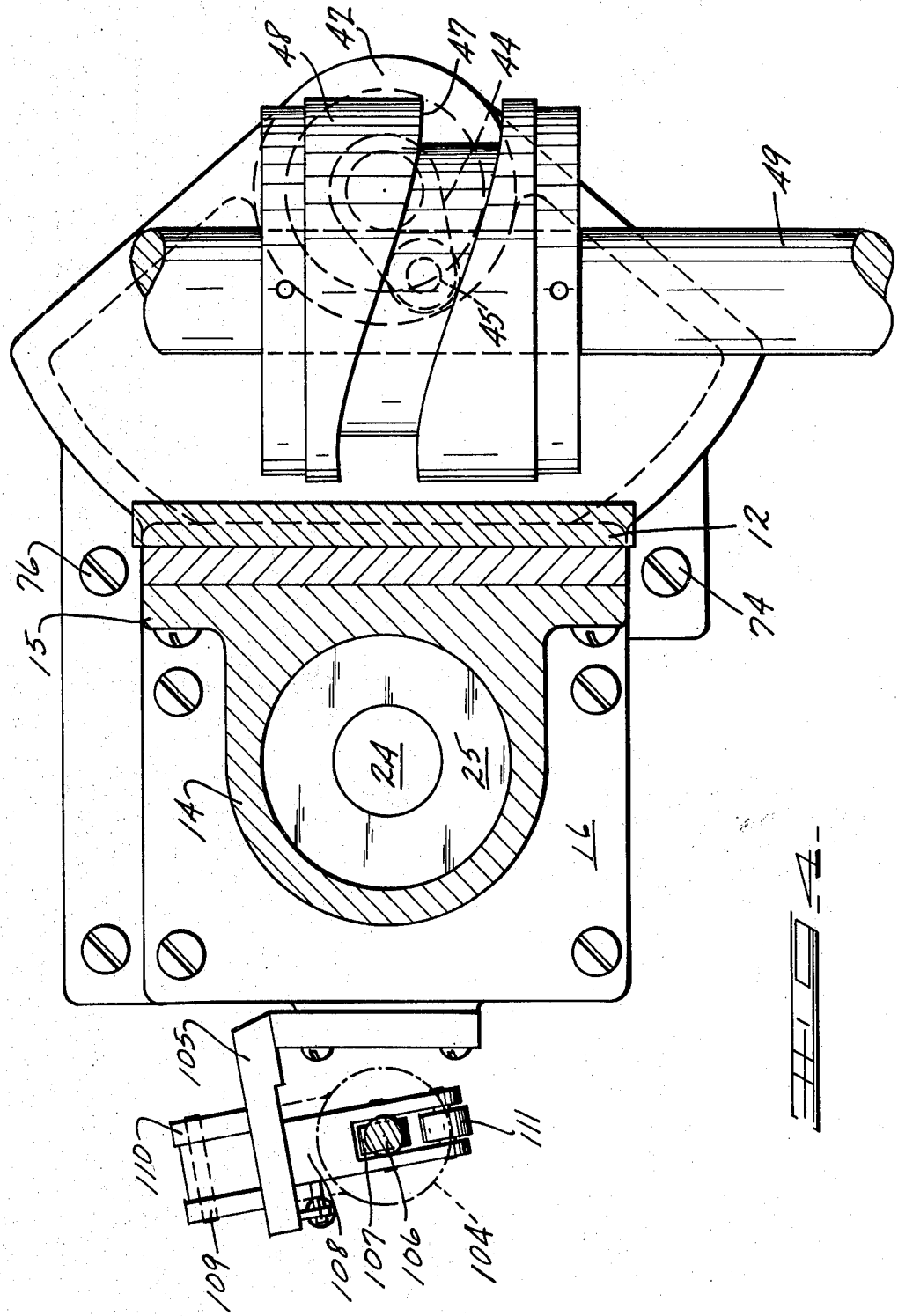
INVENTORS
GEORGE W. IRWIN &
BY URBAN P. TRUDEAU
ATTORNEYS

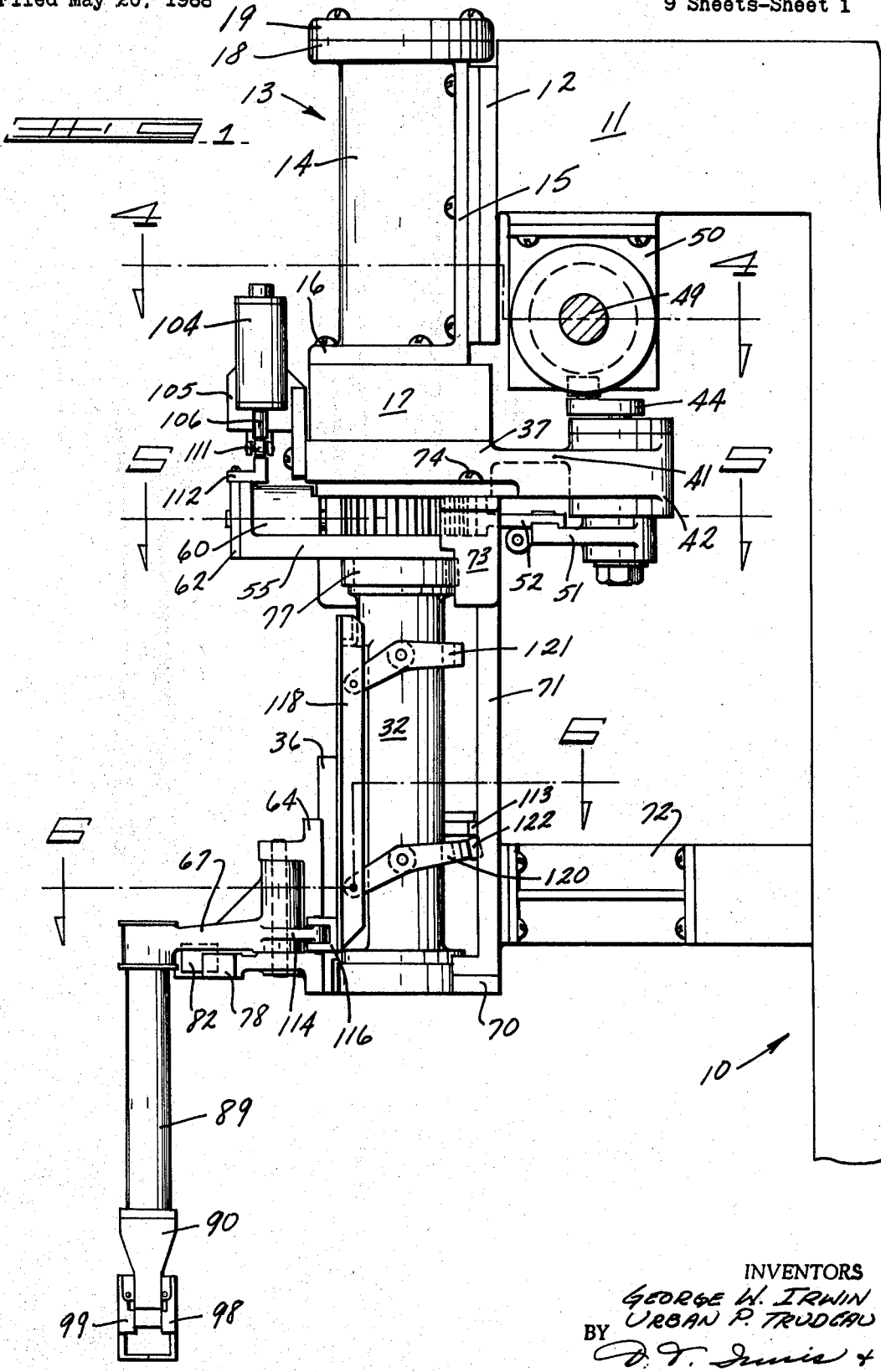

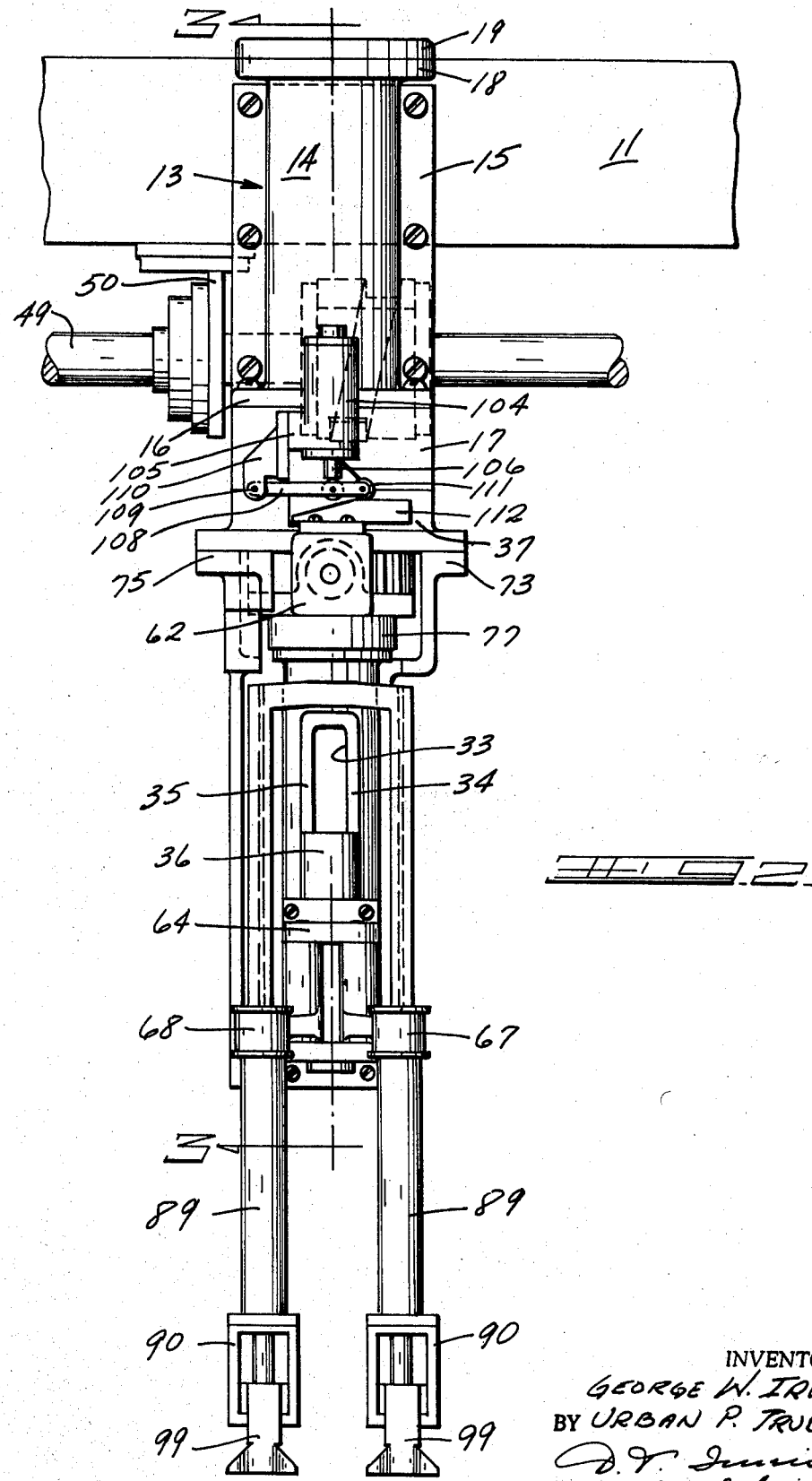

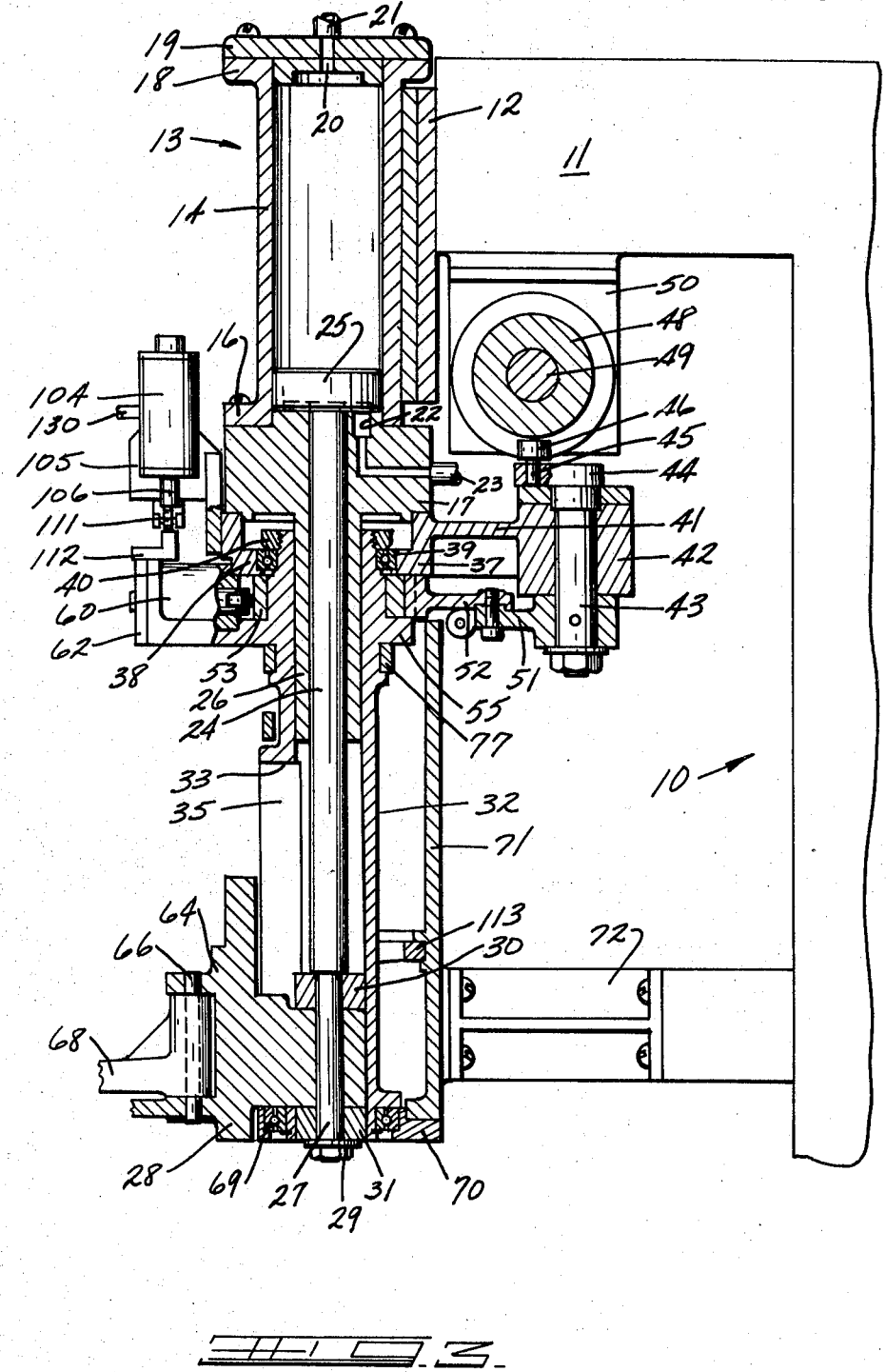

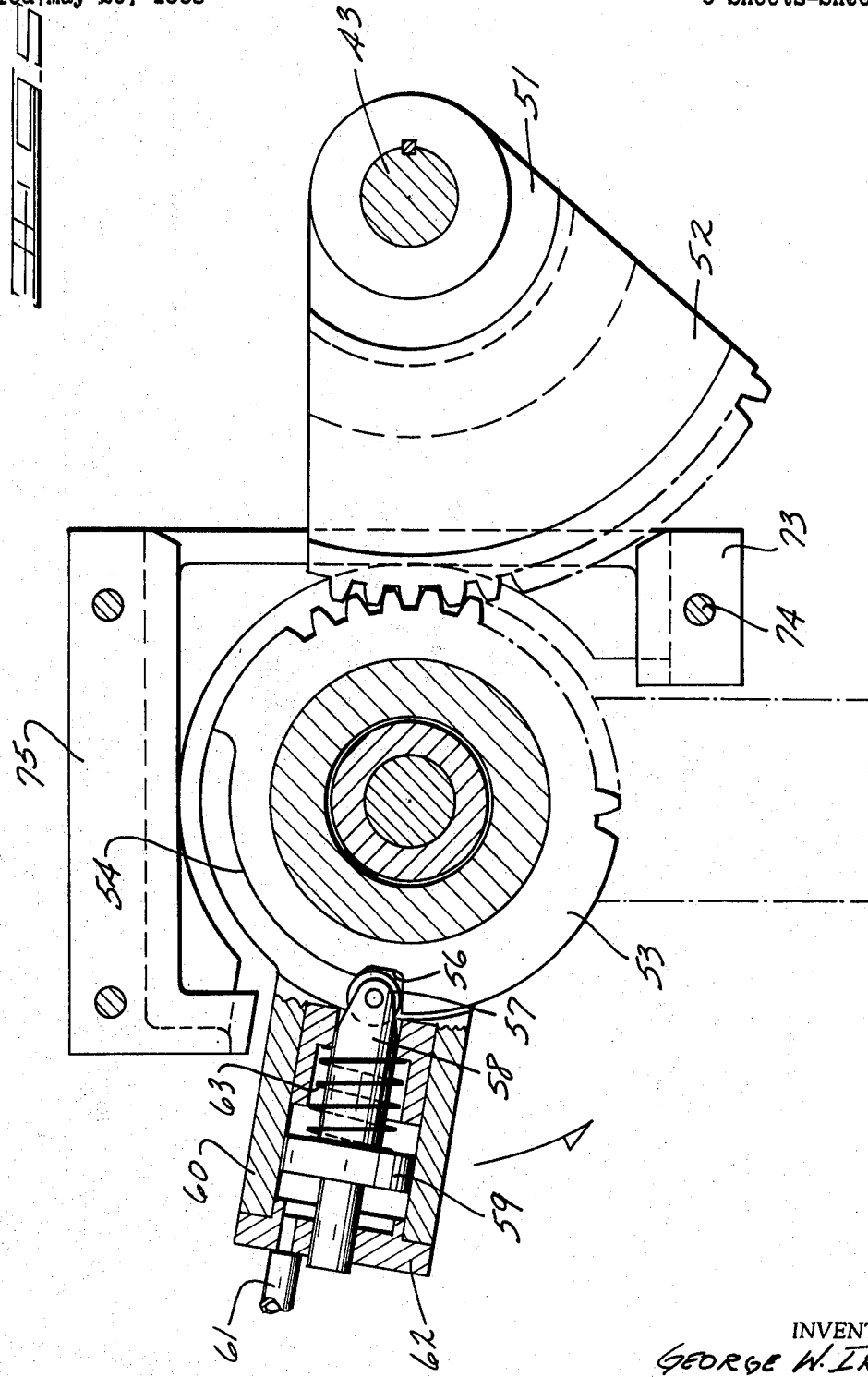

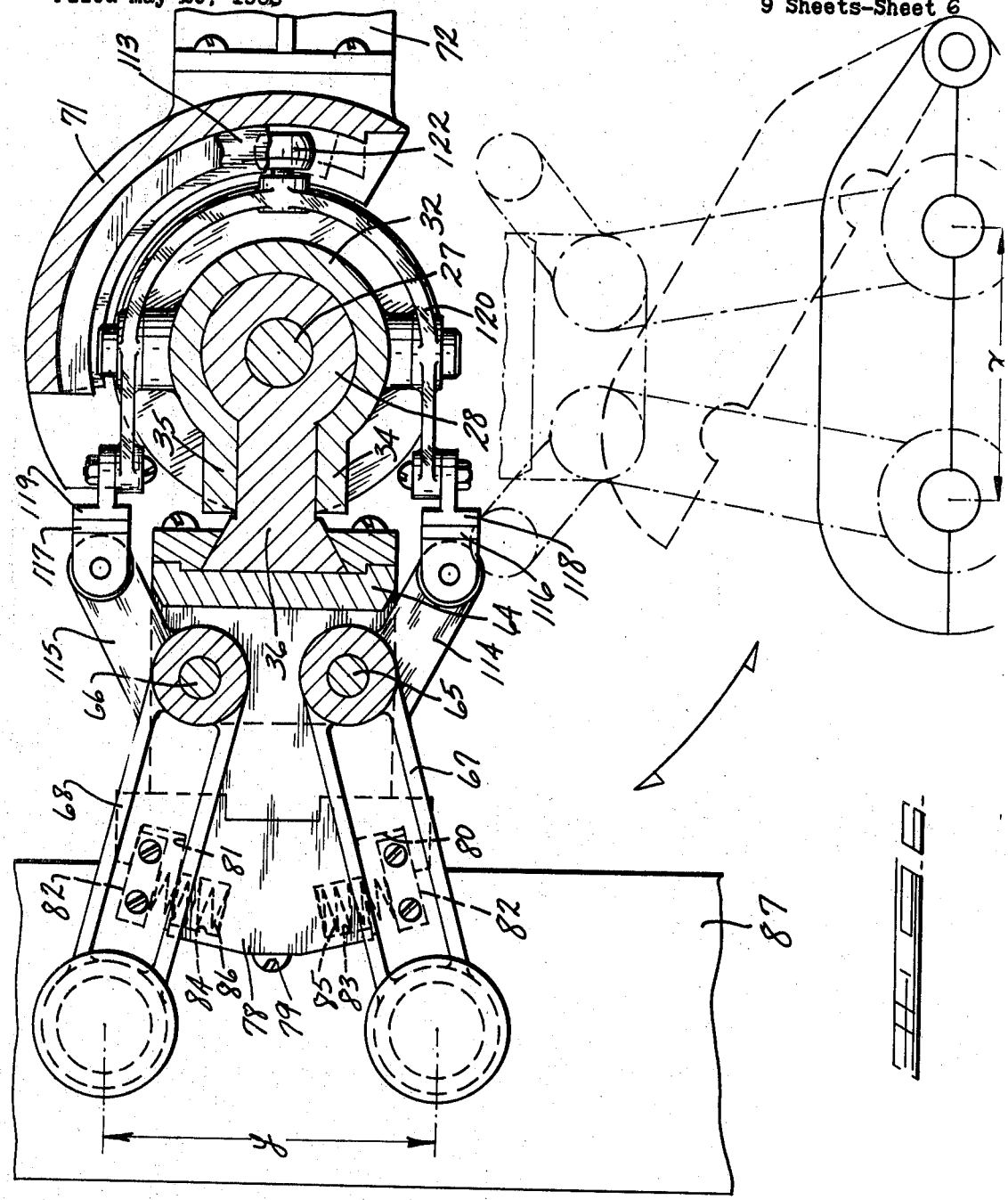

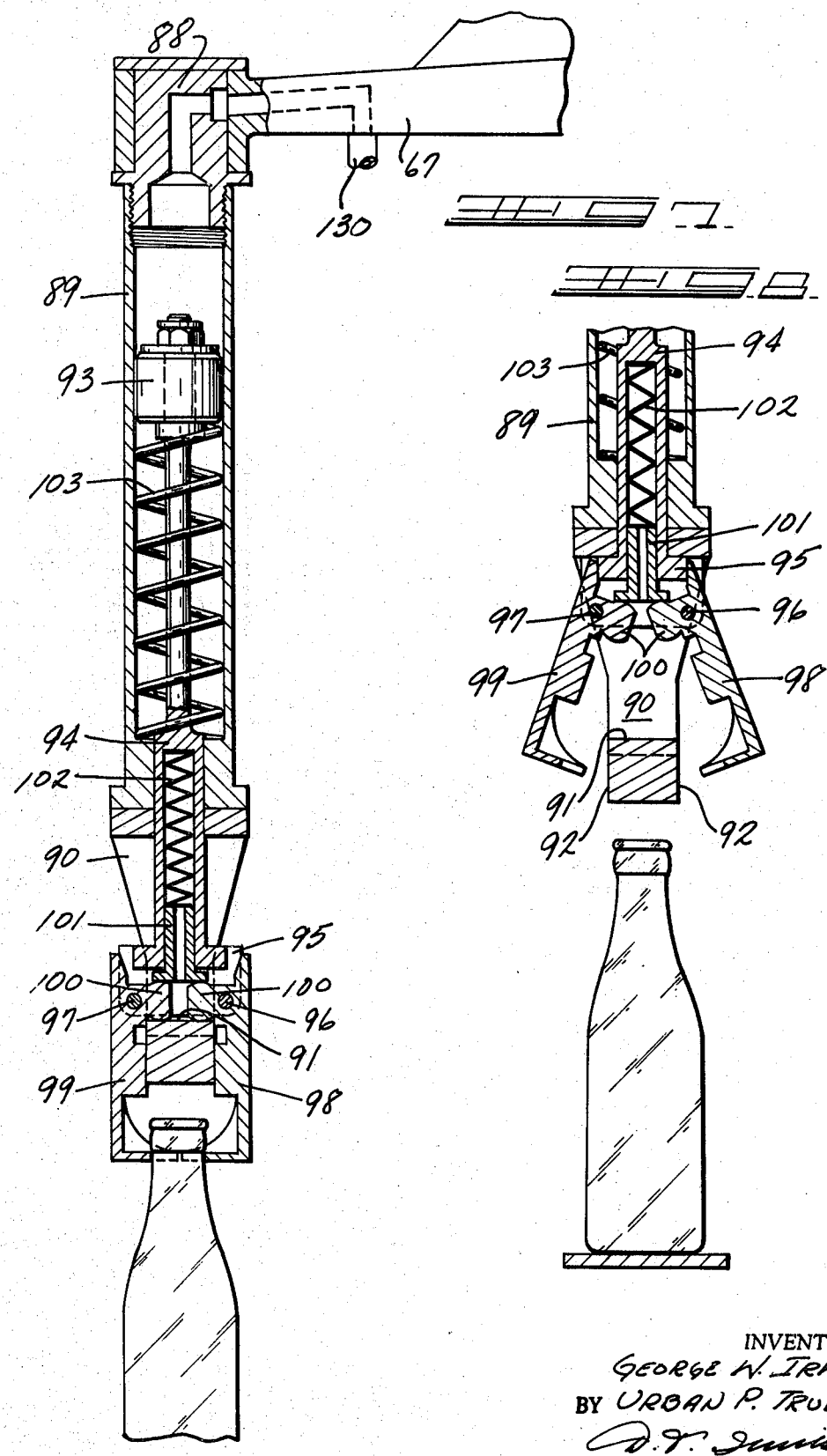

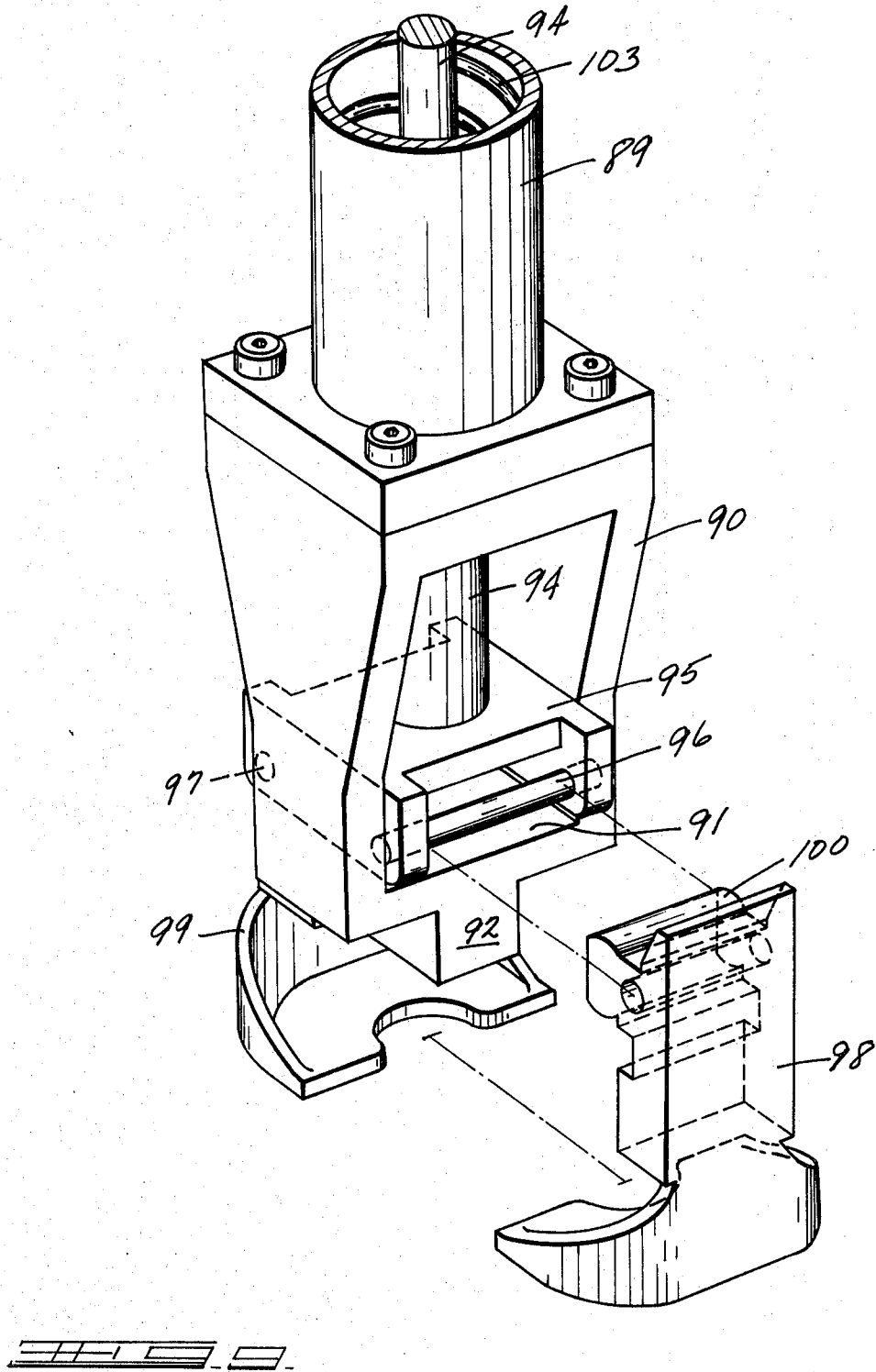

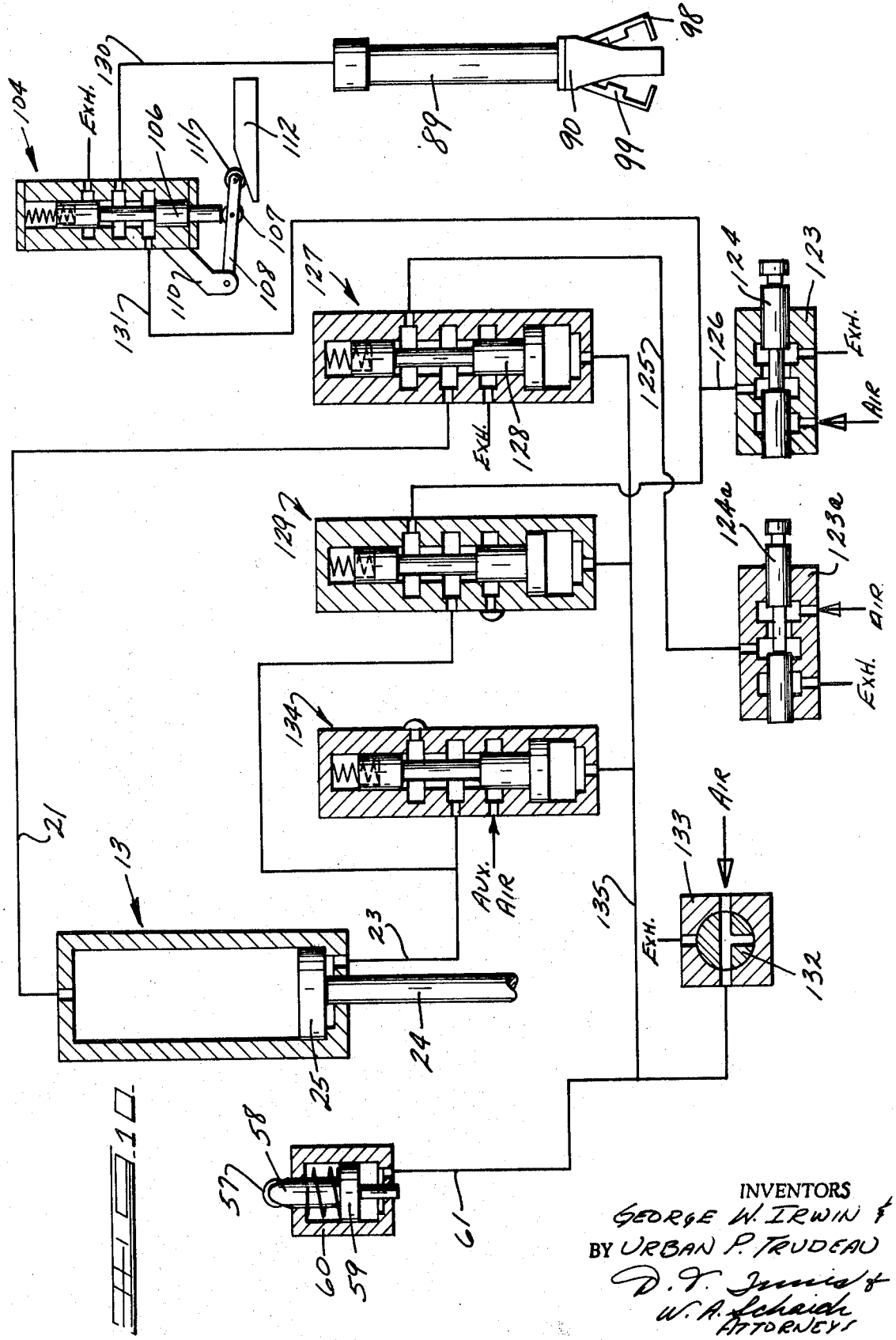

United States Patent Office 3,559,425
Patented Feb. 2, 1971

3,559,425
GLASSWARE TAKEOUT APPARATUS
George W. Irwin, Holland, and Urban P. Trudeau, Toledo, Ohio, assignors to Owens-Illinois, Inc., a corporation of Ohio
Filed May 20, 1968, Ser. No. 730,441
Int. Cl. C03b 9/40
U.S. Cl. 65—260                                    9 Claims

ABSTRACT OF THE DISCLOSURE

Glassware such as glass containers which are blown or expanded within blow molds are normally oriented in rows on a ware conveyor passing alongside of but spaced from the row of molds. When the ware is produced in tandem, conventionally the orientation of the ware in the molds is at right angles with respect to the direction of movement of the conveyor. A ware takeout apparatus operates to lift the ware from the location of the blow molds by gripping the necks of the ware and moving the ware bodily through an arc of 90° so that the ware is positioned over a moving conveyor. The ware is then lowered to a certain degree until it is positioned a short distance over the conveyor, at which time the mechanism holding the ware is opened so as to release the ware. Operation of the takeout mechanism is timed with the operation of the forming machine and a fail-safe arrangement is provided so that in the event the take-out apparatus is operating improperly, an operator may, by operating a single control valve, effectuate the movement of the takeout device to a position where it is out of the way of the moving mechanisms of the forming machine.

BACKGROUND OF THE INVENTION

This invention relates to apparatus for removing pairs of formed containers from the location of open blow molds, where the ware sits on bottom plates, by gripping the ware by their necks. Present takeout mechanisms lift the ware and normally deposit the ware on cooling boxes or "dead plates." After the ware has set up or cooled sufficiently so that the bottom of the ware is self-supporting, the ware is normally moved from the dead plate a conveyor mechanism which will carry the ware to the annealing lehr. The repeated handling of the ware, particularly by mechanism which touches the sides of the ware when it is relatively hot, may produce small scars or crizzles if, for example, the mechanism which slides the ware from the dead plate to the conveyor happens to have any volatile substance thereon. In a normal glass manufacturing plant there is a certain amount of liquids present. For example, spray for the shears, spray or dope for the molds and water cooling the molds, so that it is quite possible that the mechanism for moving the bottles may accidentally become moistened.

The present invention distinguishes over the prior art, in that the ware is removed from the blow molds and moved to the conveyors without the touching of any portion of the bottle other than the neck. It should be understood that the neck of the bottle, since it is confined in the neck molds for a considerable period of time during the forming operation, is normally well set up and cold relative to the temperature of the rest of the container so that it may be handled with less likelihood of causing a defect in the container as compared to handling the ware by the body or some other portion.

SUMMARY OF THE INVENTION

The present invention is directed to a ware takeout and spotting apparatus for transferring pairs of formed ware from a forming machine to a conveyor which is moving at right angles with respect to the orientation of the ware at the forming machine. The apparatus takes the form of a pair of vertically positioned pick-up arms which are operated in tandem by a vertical, reciprocable fluid motor. Each of the arms includes separate motor means for opening and closing the tong mechanism carried thereby. The apparatus functions to pick up ware which is positioned relative to each other at a fixed spacing and to carry the ware through an angle of approximately 90° and deposit the ware on the conveyor at a somewhat wider separation than was present at the point of pick-up.

The drive system for turning the apparatus includes a fluid operated latching means and safety means is provided, operable by fluid pressure, to automatically move the apparatus to a "parked" position regardless of what period in the cycle of operation the initiation of the safety signal is made.

BRIEF DESCRIPTION OF THE DRAWINGS

FIG. 1 is a side elevational view of the ware takeout apparatus of the invention;

FIG. 2 is a front elevational view of the apparatus of FIG. 1;

FIG. 3 is a cross-sectional view taken at line 3—3 of FIG. 2;

FIG. 4 is a cross-sectional view taken at line 4—4 of FIG. 1;

FIG. 5 is a cross-sectional view taken at line 5—5 of FIG. 1;

FIG. 6 is a cross-sectional view taken at line 6—6 of FIG. 1;

FIG. 7 is a vertical, sectional view through one of the ware pick-up arms of the invention;

FIG. 8 is a view similar to FIG. 7 showing the lower portion of the pick-up arm in open position;

FIG. 9 is a perspective view on an enlarged scale of the ware pick-up tong mechanism; and FIG. 10 is a schematic circuit diagram of the pneumatic system for operating the apparatus of the invention.

With particular reference to the drawings, the apparatus of the invention will be described in detail.

It should be understood that the takout apparatus of the invention is used in conjunction with a conventional glass forming machine, wherein charges of molten glass are first formed into parisons and then the parisons are transferred as a pair to a blow molding position (see FIG. 6), wherein the parison is expanded into the final bottle shape. The forming machine operates on a certain cycle determined by the operator and the present takeout mechanism operates in conjunction with and in synchronism with the forming machines so as to carry the formed containers away from the blow mold M and place the containers on a traveling conveyor.

With particular reference to FIG. 1, a main support member 10 which, in actual practice, may be an overhead beam is permanently located above the forming machine. The support 10 has a portion 11 which extends outwardly and the forward end has a mounting plate 12 fastened thereto. The mounting plate 12, which presents a substantially vertical surface, serves as the mount for a fluid motor generally designated 13. The fluid motor 13 is formed of a cylinder 14 having a pair of outwardly extending, vertical webs 15. The webs 15 are fastened to the mounting plate 12 by a plurality of screws, as shown. The lower end of the cylinder 14 is formed with a horizontal flange portion 16, with the flange portion 16 being bolted or fastened to a cylinder end block 17. The upper end of the cylinder 14 is also provided with a flange portion 18 to which is bolted a cylinder closing, upper end cap 19.

As best shown in FIG. 3, the end cap 19 is provided with an opening 20 formed therethrough to which is connected a pipe 21. The lower cylinder end block 17, as best shown in FIG. 3, is provided with a passageway 22 which opens into the interior of the cylinder and has its opposite end connected to a pipe 23. The end block 17 also has an axial opening formed therein through which a piston rod 24 extends, with the upper end of the piston rod being fixed to a piston 25. As best shown in FIG. 3, the end block 17 is formed with an elongated, downwardly extending guide portion 26 through which the piston rod 24 extends. Thus, it can be seen that the guide portion 26 of the block 17 serves to guide the axial movement of the piston rod 24. Thus, by the selective introduction of fluid under pressure through the pipes 21 or 23, the piston 25 will be moved upwardly or downwardly resulting in the axial reciprocation of the piston rod 24.

The lower end of the piston rod 24 is formed with a reduced diameter portion 27. A mounting block 28 is fixed to the lower end 27 of the piston rod 24 by a threaded nut 29 and a pair of spacer members 30, 31. Both the spacer members 30, 31 and the portion of the mounting block which surrounds the reduced portion 27 of the piston rod 24 are substantially cylindrical so as to slide or move vertically as a unit within a cylindrical guide 32. As best shown in FIGS. 3 and 6, the cylindrical guide 32 has a vertical, elongated opening 33 formed therein with outwardly extending, spaced-apart, vertical wall portions 34, 35 blending with the edges of the opening. The mounting block 28 has a radially extending portion 36 which extends outwardly between the wall portions 34, 35 of the cylindrical guide 32. Thus, it can be seen that as the piston 25 is reciprocated, the mounting block 28 in turn will be reciprocated, with the portion 36 of the mounting block 28 being guided by the cylindrical guide 32 and its two outwardly extending wall portions 34, 35.

As best shown in FIG. 3, the upper portion of the cylindrical guide 32 surrounds the elongated guide portion 26 of the end block 17. Beneath the block 17, a cylindrical member 37 is positioned, with the member 37 fixed with respect to the block 17 so that these two elements are stationary. The member 37 has an inwardly extending lower portion 38, as best shown in FIG. 3, which serves as the mounting for a ring bearing 39. The ring bearing 39 has its inner race fixed to the upper end of the cylindrical guide 32 by a nut 40 threaded to the upper end of the guide 32. The cylindrical member 37 has a rearwardly extending portion 41 which supports a crank bracket 42. The portion of the cylindrical member 37 which forms the crank bracket 42 is cylindrical and has a crank shaft 43 supported therein for rotation relative thereto. The upper end of the crank shaft 43 is joined to a crank arm 44, with the crank arm 44 carrying a crank pin 45. The crank pin 45 carries a cam follower roller 46. The cam follower roller 46 rides within a cam track 47 formed by the two opposed walls of a barrel-type cam member 48. The cam member 48 is fixed to a horizontal shaft 49 which is driven in synchronism with the forming machine mechanism. As best shown in FIGS. 1 and 2, the shaft 49 is supported by the extending portion 11 of the main support 10 by a mounting bracket 50.

As can best be seen when viewing FIG. 4, the cam track 47 formed by the cam member 48 will effectively cause the crank arm 44 to move in an oscillatory manner as the cam is rotated. The lower end of the crank shaft 43 is fixed to a sector member 51. The sector member 51 in turn has bolted thereto, as best shown in FIGS. 3 and 5, a sector gear 52. Thus, as the crank shaft 43 is oscillated, likewise the sector gear will be oscillated and with the particular cam shown, the sector gear will be oscillated through an angle of approximately 50°. The sector gear 52 meshes with a ring member 53, having cooperative teeth formed thereon throughout a portion of its outer surface. The ring member 53, in the diametrically opposed area with respect to the gear teeth area, is relieved at 54 along a portion of its circumference, as best shown in FIG. 5. It should be pointed out that the ring member 53, while it is shown as surrounding and being supported by a flange portion 55 of the cylindrical guide 32, it is intended to be rotatably mounted with respect thereto. One end of the relieved portion 54 of the ring member 53 is provided with a notched out portion 56 within which a latching roller 57 is adapted to seat. The latching roller 57 is connected to the extending end of a piston rod 58 which in turn is connected to a piston 59 slidably mounted within a cylinder 60. The cylinder 60 and piston 59 together form what may be termed a latching motor. The latching roller is held in engagement with the notched out portion 56 of the ring member 53 by the introduction of fluid under pressure through a pipe 61 opening into the cylinder 60 through an end closing plate 62. The latching motor is fluid-operated in one direction and spring-biased in the opposite or unlatching direction by the interpositioning of a compression spring 63 between the piston 59 and the cylinder 60. As is best shown in FIGS. 3 and 5, the cylinder 60 is formed as a part of the flange 55 of the cylindrical guide 32. Under normal operations, the latching motor will be pressure-operated so that the latching roller 57 will be held in engagement with the notch 56 thus, in effect, providing a driving connection between the driven ring member 53 and the cylindrical guide 32. In this manner and in accordance with the rotational rate of the cam 48, the cylindrical guide 32 will be oscillated through an angle of slightly greater than 90°. Obviously, oscillatory rotation of the guide 32 will also move the mounting block 28.

With reference to FIG. 6, the mounting block 28 and in particular its extending portion 36, carries a mounting bracket 64. The bracket 64, in effect, is mounted for vertical adjustment with respect to the extending portion 36 of the block 28; however, once adjusted, it becomes fixed relative thereto. The mounting bracket serves as support bearings for a pair of vertical arm mounting shafts 65, 66. The shafts 65, 66 pivotally mount one end of a pair of outwardly extending ware take-out arms 67, 68 respectively. In order to steady the movement of the take-out arms, and to eliminate vibrations as much as possible, the cylindrical guide 32 (see FIG. 3) is supported at its lower end by an annular bearing 69 carried within a lower ring bracket 70. The bracket 70 in turn is fixed to the lower end of a semi-cylindrical fixed support 71. The semi-cylindrical support 71 is mounted to the main support 10 by a conventional beam member 72.

The upper end of the semi-cylindrical support 71 presents an enlarged boss 73 to the upper surface of which is fixed the mounting flange of the member 37 by a screw 74. The support 71 also carries adjacent its upper end, but at a position approximately 180° removed, a second elongated boss 75 to which the opposed side of the member 37 is fastened by screws 76. As best shown in FIGS. 1, 2 and 3, the support 71 carries a spacer collar portion 77, actually formed in two pieces, which embraces the cylindrical guide 32. It will be readily apparent that the collar 77 and the support 71 are fixed; however, permitting the cylindrical guide to rotate within the collar portion 77.

With particular reference to FIGS. 6–9, the mounting arrangement and mechanical parts of the ware pick-up arms will be described.

As best shown in FIG. 6, the arm mounting bracket 64 has a clevis adapter 78 fixed to the upper extending end thereof by a screw 79. The clevis adapter 78 has a pair of vertical cut-out portions or notches 80, 81. The arms 67, 68 extend over the notches 80, 81 respectively, with each arm having a downwardly extending, substantially rectangular block 82 fixed thereto and extending within the notches 80, 81. The clevis adapter 78 also has a pair of recessed openings 83, 84 which face outwardly into the notch areas 80, 81 and compression springs 85, 86 are seated within the recesses 83, 84, with their outer ends biased against the blocks 82, thus effectively biasing the arms 67, 68 outwardly against the facing surfaces of the notches 80, 81. When the blocks 82 are in abutment with the clevis adapter 78, the arms are in their farthest-apart position. This is the position that the arms will assume when they are positioned over a ware conveyor 87.

At the outer ends of each of the arms 67, 68, there is positioned a cylinder cap 88 to the lower end of which is threaded a cylinder 89. To the lower end of the cylinder 89 is fixed a take-out tong guide 90. The guide 90 essentially presents a fixed, horizontal surface 91 and a pair of opposed vertical surfaces 92 extending downwardly from the horizontal surface. The cylinder 89 encloses a piston 93 to which is connected a take-out plunger 94. The lower end of the take-out plunger 94 terminates in a tong holder 95.

As best shown in FIG. 9, the tong holder 95 supports a pair of pivot pins 96, 97. Each pivot pin 96, 97 in turn pivotally supports take-out tongs 98, 99. Each of the takeout tongs 98, 99 is provided with a radially, inwardly extending cam lobe portion 100 whose upper surface is in engagement with a spring-biased hold-down plunger 101. The hold-down plunger 101 is slidably received within a lower opening in the plunger 94 and is biased outwardly with respect thereto by a compression spring 102.

The take-out plunger 94 and piston 93 are biased upwardly by a spring 103; however, during operation of the apparatus to transfer ware, air under pressure will be maintained within the upper end of the cylinder 89 causing the piston 93 and plunger 94 to be held downwardly in the position shown in FIG. 7 wherein the take-out tongs 98, 99 are in a closed position, gripping the neck of the container or ware beneath the take-out bead.

As can readily be seen, the tong halves 98, 99, when in juxtaposed ware-engaging position, have their facing surfaces in abutment with the vertical surfaces 92 of the take-out tong guide 90. When the ware is positioned over the conveyor, the air under pressure is released from the top of the cylinder 89 and the spring 103 pushes the piston 93 upwardly raising the tong holder 95. As the lower surfaces of the cam lobes 100 move upwardly off of their engagement with the horizontal surface 91 of the take-out tong guide 90, the tongs 98, 99 move apart, thus releasing the ware. This outward movement of the tongs is assured by the downwardly biased hold-down plunger 101. The tongs 98, 99 only move apart an amount determined by the abutment of their upper portions with the sides of the take-out tong holder 95. Thus, it can be seen that the tongs themselves are only closed when the air under pressure is being fed to the cylinder 89 and when the piston 93 has traveled downwardly to substantially its fullest extent. The cycle of operation of the tong mechanism will be explained more fully with respect to the explanation of the schematic fluid circuit of FIG. 10.

Basically, the air to the tongs is turned off and on by the main timing drive during that period of its cycling operation when the tongs are moved to the position shown in dotted line in FIG. 6. It will readily be appreciated that when the tongs are in the position shown in dotted line in FIG. 6, the tongs are positioned over the ware at the blow molding station.

When the ware is positioned by the tongs over the conveyor, the air is released by the operation of a control valve 104 so as to permit the tongs to open. The valve 104 is normally closed, in the sense that it permits the air supply or exhaust from the main timing valve to be connected to the upper ends of the arm cylinders 89. However, it is necessary that when the arms are over the conveyor, that the tongs be open, thus requiring that the air above the pistons 93 be exhausted out of sequence with the main timing valve. In the sequence of operation this is accomplished by the operation of valve 104. The valve 104 is mounted by a bracket 105 to the stationary cylindrical member 37.

The valve 104 has a control spool 106, a portion of which extends axially downward therefrom under the action of a biasing spring. The lower end of the spool 106 abuts a roller 107 carried intermediate the length of a bifurcated arm 108. The arm 108 is pivotally connected at 109 to a bracket 110 which also is fixed to the member 37. The non-pivoted end of the arm 108 carries a cam follower roller 111. The roller 111 rides on the upper surface of a cam 112. The cam 112 is fixed to the upper edge of end plate 62 of the cylinder 60. It should be remembered that the cylinder 60 is oscillated by the drive mechanism to move through an angle of between 90° and 100° and during the end portion of its movement, the cam 112 will engage the roller 111 and move it upwardly to shift the spool 106 of the valve 104 to effectively exhaust the air from the upper end of the cylinder 89. This then serves to open the tongs and permit the ware to be released onto the conveyor at the proper time.

As previously explained, when the tong arms are positioned over the ware at the blow station, they will be apart a distance X and when the tongs are moved to the position shown in full line on FIG. 6, they will be apart a distance Y which is greater than the distance X. This is desirable from the standpoint that release of the ware on the conveyor may be more precisely accomplished without danger of the ware tipping or interfering with the movement of other ware on the conveyor if the distance between the individual pieces of ware is adjusted.

With reference to FIGS. 1 and 6, and as previously explained, the springs 85, 86 will hold the arms 67, 68 apart a distance Y. However, when the arms are swung back to the position of the molds M, it is necessary that the arms be moved toward each other against the force of the springs 85, 86. This movement may be carried out while the arms are in either elevated or lowered position through the functional control of a cam 113 fixed to the inner surface of the support 71.

The arms 67, 68 are manipulated through a pair of crank arms 114, 115, respectively, which are fixed thereto. The ends of the crank arms 114, 115 are pivotally connected to slide blocks 116, 117. The slide blocks 116, 117 bear against vertically elongated T bars 118, 119. The T bars 118, 119 are supported at the ends of a pair of vertically spaced yokes 120, 121 by pivotal connections. The yokes 120, 121 are pivotally supported at diametrically opposed points by the cylindrical guide 32. The lower yoke 120, at its mid point, carries a roller 122.

As can readily be seen when viewing FIG. 1, the roller 122 bears against the cam 113, it being understood that the undersurface of the sector cam 113 is the active camming surface. In the position of the arms of FIG. 1 and FIG. 6, the roller 122 is on the low point of the cam 113 so that the springs 85, 86 bias the arms 67, 68 apart. When the cylindrical guide 32 and the arms 67, 68 are rotated to the position overlying the mold M, as shown in dotted line on FIG. 6, the roller 122 will be pushed downwardly by the cam 113 resulting in an outward shifting or movement of the T bars 118, 119. The bars 118, 119 move bodily outwardly with their outer surfaces remaining vertical due to the fact that the yoke 121 forms a parallel link with the yoke 120. The outward movement of the T bars 118, 119 will push the blocks 116, 117 outwardly with respect to the cylindrical guide 32. This outward shifting or movement of the blocks 116, 117 results in clockwise movement of the arm 67 and counter-clockwise movement of the arm 68. This movement, as will be readily appreciated, is against the springs 85, 86 and thus when the arms are in the position shown in dotted line in FIG. 6, they will be at a closer separation distance X than when they are positioned over the conveyor and are at a separation distance Y.

As previously described, the cyclic, swinging movement of the ware take-out mechanism, wherein the arms are alternately positioned over the mold and the conveyor, is controlled entirely by the drive shaft 49 through the cam 48. The cam oscillates the sector gear 52 which in turn oscillates the ring member 53. Through the latching roller 57, its piston 59 and cylinder 60, the oscillatory movement of the member 53 is transmitted to oscillatory movement of the cylindrical guide 32 which carries the arms 67, 68. This oscillatory motion is continuous; however, in the event it is desired to discontinue this motion and to "park" the arms, the air behind the piston 59 is discontinued and the latching roller 57, under the influence of the spring 63, disengages the notch 56 and the roller then moves freely within the relieved portion 54 of the member 53. This, in effect, disengages the oscillating member 53 from the cylinder 60 and the flange portion 55 of the upper end of the cylindrical guide 32. In this manner, mechanical disengagement is effected between the drive shaft 49 and the arm-carrying, cylindrical guide 32. The operation of the previously described apparatus and the sequence of the various functions involved in the normal operation of the take-out mechanism will be described with reference to FIG. 10.

Main timing valves 123 and 123a, having spools 124 and 124a extending therethrough, are connected to a source of air under pressure entering the valves at the ports to which the arrows on the drawing are directed. The spools 124 and 124a are cyclically shifted from the position shown, to the left, by the main timing drum of the glass forming machine with which the take-out mechanism is associated.

The valves 123 and 123a have pressure lines 125, 126 connected thereto through which the air under pressure is alternately fed or exhausted, depending upon the position of the spools 124 and 124a. With the valve spools 124 and 124a in the position shown in FIG. 10, the air under pressure is being fed through the line 125, while the line 126 is in communication with the right end exhaust port. The line 125 leads to a first control valve 127 which is of the piston-operated spool type with spring return. In the position shown, the valve 127 has its spool 128 in elevated position. With the spool 128 positioned as shown, the fluid under pressure in the line 125 passes through the valve 127, exiting by the line 21 connected to the top of the motor 13. With pressure in the line 21 of the motor 13, the piston 25 will be moved down to the position shown, with the air beneath the piston being exhausted by way of the line 23 through a second control valve 129 and thence to the line 126 and to the exhaust port in valve 123.

The take-out tong operating motor 89, which is connected by a line 130 to the center port of the valve 104, is in communication with a line 131 extending from the lower port of the valve 104 to the line 126. Thus the motor 89 at this precise moment is connected to exhaust. Thus the takeout tongs 98, 99 are open as shown. This would correspond to the position of the arms being over the molds and down just prior to closing of the tongs to grip the ware. Closing of the tongs will occur when the spool 124 of the valve 123 is shifted to the left connecting the air under pressure to the line 126, while at the same time the line 125 remains connected to the air supply. This assures closing of the tongs before the piston 25 starts to move up. After a short interval, the spool 124a is shifted, thus exhausting the air on top of the piston 25 and permits the piston to rise and results in elevating the tong arms.

The air under pressure in the line 126 passes through the control valve 129 then to the line 23, to the bottom of the motor 13. At the same time as the air is introduced to the bottom of motor 13, air in the line 126 is connected through the line 131 to the valve 104 and then through the line 130 to the take-out tongs operating motor 89 and, as previously described, the feeding of fluid under pressure to the upper end of the tong cylinder 89 will cause the take-out tongs 98, 99 to move into gripping or closed position. The tongs will remain closed since the air pressure present in the line 131 remains connected to the line 130. However, when the tong arms have been moved to the position where they overlie the conveyor, the cam 112 will have been moved to the position where it contacts roller 111 and pivots the arm 108 upwardly. Upward pivoting of the arm 108 will move the spool 106 upwardly, thus cutting off the air entering the valve 104 through the line 131 and at the same time connecting the line 130 to the exhaust port of the valve 104. This results in the opening of the tongs 98, 99 to release the ware onto the conveyor.

As previously stated, there is a safety function provided so that at any portion of the cycle of operation of the above-described mechanism, it may be disabled and provision is made so that the take-out mechanism will move into a "parked" position where it is out of danger of interfering with any other mechanisms or movements of the forming machine. Initiation of the movement of the take-out arms into "parked" position is accomplished by turning the spool 132 of a valve 133, 90° in a clockwise direction. During normal operation of the apparatus, air under pressure fed to the valve passes through the valve 133 into the line 61 effectively holding the latching piston 59 in the position shown in FIG. 5 and also holding the spools of control valves 127, 129 and safety control valve 134 in the "up" positions through branch line 135.

As shown in FIG. 10, the line 135 is connected to the air motor ends of each of the control valves 127, 129 and safety valve 134, maintaining them in the position shown. When the valve spool 132 is turned 90°, the lines 61 and 135 are connected to the exhaust port in the valve 133 and the spools of the control valves 127, 129 and safety valve 134 shift downwardly substantially simultaneously.

Shifting of the spool 128 in valve 127 connects the line 21 to exhaust. An auxiliary air supply connected to the safety valve 134, as indicated, passes to the line 23, resulting in raising the piston 25. Downward shifting of the spool in valve 129 merely results in blocking the auxiliary air flow in the line 23 from passing through the valve 129 since its lower port ˙s plugged, as shown. Thus, it can be seen that since the line 61 is exhausted, the latching roller 57 is disconnected from the oscillating member 53 and while the member 53 continues to oscillate its motion is not transmitted to the arm-turning, cylindrical guide 32. Since motor 13 is also operated to raise the piston 25, the arms will be raised out of the way.

It should also be apparent when viewing FIG. 5, that retracting of the latching roller 57, will not totally retract this roller from the circumference of member 53, but merely permits the roller 57 to ride unimpeded in the relieved portion 54. The radial wall of the notch 56 will still engage the roller 57, thus assuring that the motor 60 will always end up in the "parked" position shown in solid lines in FIG. 5. Also, the cam 112 will be in the position of holding the spool 106 of the valve 104 upwardly, thereby exhausting the air within the tong motor 89 and the tongs will be open in the "parked" position. Thus, the "parked" position is with the tong arms generally overlying the conveyor in raised position and with the take-out tongs open. Continued running of the drive shaft 49 will not shift or swing the arm mechanism and its cylindrical guide 32 because the latching roller 57 is in its retracted position.

It should be pointed out, and as illustrated in FIG. 5 by the two extreme positions of the motor 60, that the motor normally is oscillated about the central axis of the mechanism through an angle of about 100°. After 90° of the movement has occurred, the cam 112 will shift the valve spool 103 to release the ware to the conveyor and the additional 10° movement merely carries the empty arms through an added arc before the arms are moved back to the position of the molds for the next pair of ware. Obviously, the ware is picked up at a lower level and released at the upper level of the conveyor.

Other and further modifications may be resorted to without departing from the spirit and scope of the appended claims.

We claim:

1. Ware takeout and spotting apparatus for transferring pairs of formed ware from a forming machine to an elevated conveyor moving at right angles to the orientation of the ware at the forming machine comprising, a vertically positioned, reciprocating fluid motor, a substantially cylindrical guide member mounted below and in vertical alignment with said motor, the piston rod of said motor extending downwardly coaxial with said cylindrical guide member, means supporting said guide member for rotation about its vertical axis, a pair of ware pick-up arms, pick-up arm mounting means connected to said piston rod and extending radially through an elongated, vertical opening in said cylindrical guide member, a ring gear rotatably mounted coaxially of said guide member and rotatable with respect thereto, drive means connected to said ring gear for continuously oscillating said ring gear through an angle of at least 90°, latching means carried by said guide member and engageable with said ring gear for oscillatingly driving said cylindrical guide member, means carried at the lower end of said pick-up arms for grasping the necks of ware, and means connected to said grasping means for operating same, whereby ware is picked up at the forming machine and released at the conveyor.

2. The apparatus of claim 1, wherein said latching means comprises a horizontal fluid motor mounted on said guide, said horizontal fluid motor having an output rod extending radially inward toward the outer circumference of said ring gear, a roller carried by the extending end of said rod and adapted to seat within a notch formed in the periphery of said ring gear, whereby the horizontal fluid motor is latched to the ring gear.

3. The apparatus as defined in claim 2, further including pivot means connecting said pick-up arms to said pick-up arm mounting means, spring means mounted in said arm mounting means biasing said arms away from each other, crank arms connected to said arms and extending radially from the pivotal mounting of said arms, cam-operated means supported by said guide and engageable with said crank arms for moving said crank arms and pivoting said pick-up arms toward each other against the force of said spring means, said cam-operated means being actuated when the pick-up arms are positioned at the forming machine.

4. The apparatus as defined in claim 2, further including timing means connected to said source of fluid pressure to alternately connect said source to opposite ends of said vertical motor to reciprocate said motor in sequence, an auxiliary source of fluid pressure connected to the lower end of said motor, valve means normally blocking said pressure from said motor, and selectively operable means connected to said valve and to said horizontal motor for unlatching said latching means and feeding said auxiliary air supply to said vertical motor, whereby said cylindrical guide is elevated and turned to the position where the pick-up arms are over the conveyor when said selectively operable means is operated to place the pick-up apparatus in "parked" position.

5. The apparatus as defined in claim 1, wherein said means connected to said grasping means for operating same comprises a fluid-actuated, spring-return, piston motor, fluid pressure means connected to the upper end of said motor, an elongated rod connected to the piston and extending below the motor, said grasping means being mounted on the lower end of said elongated rod and opened and closed by vertical reciprocation thereof, and timing means connected to said fluid pressure means for cycling fluid pressure to said motor.

6. The apparatus as defined in claim 5, further including valve means interposed said timing means and said grasping means operating motor, and stationary cam means responsive to movement of the pick-up arms to the position over the conveyor for operating said valve means to exhaust pressure from said grasping means operating motor to open the ware-grasping means.

7. Glassware takeout tongs adapted to be moved into alignment with the ware at a molding position and moved into overlying relationship with respect to a conveyor; comprising a vertical cylinder, piston means mounted for movement in said cylinder, an elongated plunger connected to said piston means and extending through the lower end of said cylinder, a tong guide mounted on and extending below said lower end of said cylinder and formed with a substantially rectangular bar portion presenting a horizontal upper surface and vertical opposed side surfaces, a tong holder mounted to the lower end of said plunger, a pair of complementary tongs pivotally supported on the lower end of said holder, said tongs being formed with inwardly extending lobe cams adapted to engage the horizontal surface of said bar portion of said tong guide to position said tongs in juxtaposed, closed position and means biasingly engaging the upper surface of said lobe cams.

8. The apparatus of claim 7, further including spring means within said cylinder normally biasing said piston in an upward direction and fluid pressure means connected to the upper end of said cylinder for moving said piston in a downward direction against said biasing spring.

9. The apparatus of claim 8, wherein the means biasingly engaging the upper surface of said lobe cams comprises a hold-down plunger axially slidable in a recess in the lower portion of said plunger, spring means biasing said hold-down plunger in a downward direction, said hold-down plunger engaging the upper surface of said cams, whereby said tongs are opened when raised and their cams move upwardly relative to the horizontal surface of said tong guide.

References Cited

UNITED STATES PATENTS

| | | | |
|---|---|---|---|
| 1,211,611 | 1/1917 | Meyer et al. | 214—151 |
| 1,792,267 | 2/1931 | Badger | 65—241 |

ARTHUR D. KELLOGG, Primary Examiner

U.S. Cl. X.R.

65—239, 241; 214—151